United States Patent [19]

Holroyd

[11] Patent Number: 5,015,995
[45] Date of Patent: May 14, 1991

[54] FLUID LEVEL MONITOR

[75] Inventor: Trevor J. Holroyd, Derby, England

[73] Assignee: Stresswave Technology Limited, Derby, England

[21] Appl. No.: 425,970

[22] Filed: Oct. 24, 1989

[30] Foreign Application Priority Data

Dec. 3, 1988 [GB] United Kingdom ............... 8828282

[51] Int. Cl.$^5$ ............................................ G08B 21/00
[52] U.S. Cl. .................................. 340/621; 73/290 V; 367/908; 340/617
[58] Field of Search ...................... 340/621, 618, 617; 73/290 V; 367/908

[56] References Cited

U.S. PATENT DOCUMENTS

| 1,144,517 | 3/1979 | Baumoel | 73/290 V X |
| 4,182,177 | 1/1980 | Prough | 73/290 V |
| 4,679,430 | 7/1987 | Scott-Kestin et al. | 340/621 X |

FOREIGN PATENT DOCUMENTS

| 1555549 | 7/1976 | United Kingdom . |
| 2036325 | 6/1980 | United Kingdom . |
| 2123326 | 10/1982 | United Kingdom . |
| 2137348 | 3/1984 | United Kingdom . |

OTHER PUBLICATIONS

Abstract, Instrumentation, Measuring and Testing, p. 19 (SU 798492).
Abstract, Instrumentation, Measuring and Testing, p. 21 (SU 877342).

Primary Examiner—Joseph A. Orsino
Assistant Examiner—Jeffery A. Hofsass
Attorney, Agent, or Firm—Cushman, Darby & Cushman

[57] ABSTRACT

A fluid level monitor for monitoring the fluid level in a tank comprises a first pair of transducers arranged in a vertically upper horizontal plane and a second pair of transducers arranged in a vertically lower horizontal plane. Pulse generators send electrical pulses to the transmitter transducers which transmit stress waves into the wall of the tank. The stress waves propagating peripherally are detected by the receiver transducers and processors analyze the amplitude of the detected stress waves to determine if the fluid is present or absent at the upper and lower horizontal planes. The pulse generators are arranged to send pulses out of phase so that stress waves propagating axially can be detected to determine alterations of the fluid level between the upper and lower horizontal planes. The processors may be arranged to operate alarms or to operate valves to control the fluid level in the tank.

18 Claims, 3 Drawing Sheets

U.S. Patent    May 14, 1991    Sheet 1 of 3    5,015,995
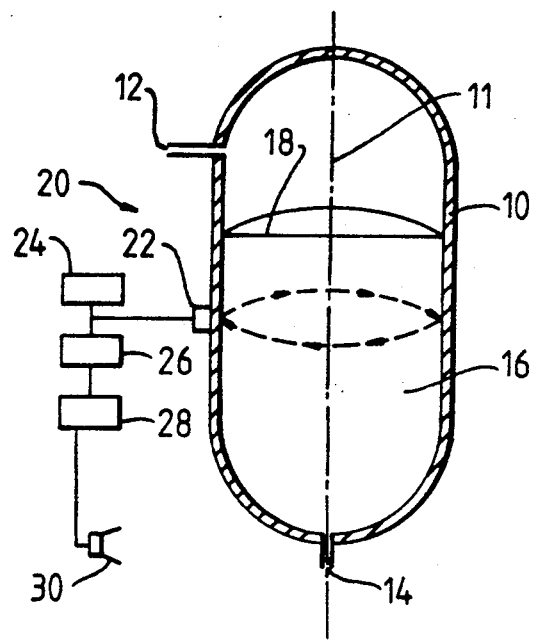
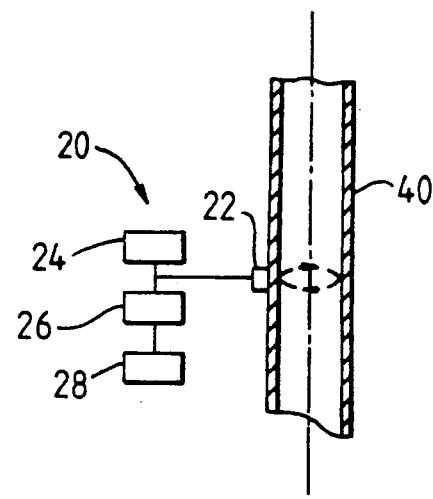
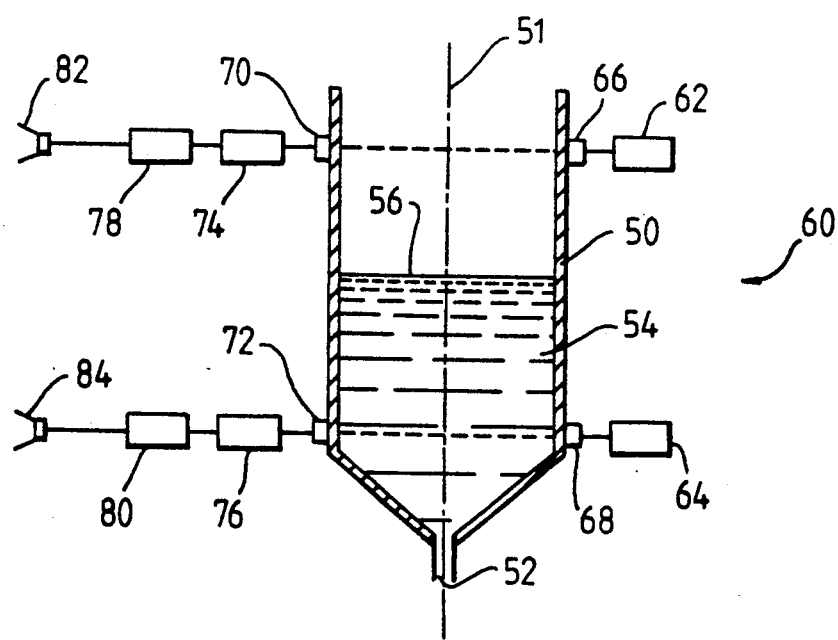

FLUID LEVEL MONITOR

BACKGROUND OF THE INVENTION

The present invention relates to fluid level monitors for monitoring the level of fluid in a vessel.

A known method of monitoring fluid levels in a vessel is to perform a time of flight measurement. A transducer emits a pulse of ultrasound from either above or below a fluid level and the reflection of the ultrasound from the fluid surface is detected by the transducer, and the time taken for the ultrasound to travel from the transducer to the fluid surface and back is measured. Using the knowledge of the velocity of the ultrasound in the fluid it is possible to then calculate the fluid level.

A further method of monitoring fluid levels in a vessel uses a transducer to emit a pulse of ultrasound in a plane perpendicular to the axis of the vessel and the reflection of the ultrasound from the opposite wall of the vessel is detected by the transducer and the magnitude of the reflected ultrasound is measured.

Both these methods require the fluid to be able to allow the passage of ultrasound therethrough.

SUMMARY OF THE INVENTION

Accordingly the present invention seeks to provide a novel apparatus for monitoring the level of fluid in a vessel.

The present invention provides a fluid level monitor for monitoring the level of fluid in a vessel comprising first acoustic emission transducer means acoustically coupled to the wall of the vessel substantially in a first plane perpendicular to the longitudinal direction of the vessel, second acoustic emission transducer means acoustically coupled to the wall of the vessel substantially in a second plane perpendicular to the longitudinal direction of the vessel, the first and second planes being longitudinally spaced, the first transducer means being arranged to transmit stress waves into the wall of the vessel, the stress waves propagate around the periphery of the wall and are damped by any fluid contacting the wall in the first plane, the first transducer means being arranged to detect stress waves propagating in the wall and to convert them into a first electrical signal, the first electrical signal corresponds to the stress wave activity detected by the first transducer means, first means for determining the presence/absence of fluid at at least a portion of the first plane from the amplitude of the first electrical signal corresponding to the stress wave activity detected, the second transducer means being arranged to transmit stress waves into the wall of the vessel which propagate around the periphery of the wall and are damped by any fluid contacting the wall in the second plane, the second transducer means being arranged to detect stress waves propagating in the wall and to convert them into a second electrical signal, the second electrical signal corresponds to the stress wave activity detected by the second transducer means, second means for determining the presence/absence of fluid at at least a portion of the second plane from the amplitude of the second electrical signal corresponding to the stress wave activity detected, the first transducer means and second transducer means being positioned substantially in at least one plane parallel to the longitudinal direction of the vessel such that stress waves transmitted into the wall of the vessel by at least one of the first transducer means or second transducer means and propagating generally longitudinally along the vessel are detected by the second transducer means or first transducer means to produce a third electrical signal, means for determining the alteration of the fluid level between the first plane and the second plane from the amplitude of the third electrical signal.

The first and second transducer means may be arranged to transmit stress waves into the wall of the vessel alternately.

The vessel may be a pipe.

The vessel may be a container.

The fluid may be a liquid, a particulate substance or a powder substance.

The first transducer means may comprise a first transducer which transmits stress waves into the wall of the vessel and a second transducer which detects stress waves propagating in the wall of the vessel.

The first and second transducers may be equi-spaced such that stress waves propagating in opposite directions in the wall of the vessel converge at the second transducer to produce relatively higher detected stress wave activity.

The second transducer means may comprise a third transducer which transmits stress waves into the wall of the vessel and a fourth transducer which detects stress waves propagating in the wall of the vessel.

The third and fourth transducers may be equi-spaced such that stress waves propagating in opposite directions in the wall of the vessel converge at the fourth transducer to produce relatively higher detected stress wave activity.

The first transducer and the fourth transducer may be arranged substantially in a third plane parallel to the longitudinal direction of the vessel, the second transducer and the third transducer are arranged substantially in a fourth plane parallel to the longitudinal direction of the vessel.

The third and fourth planes may be coplanar.

The longitudinal direction of the vessel may be vertical.

The first transducer may be arranged substantially vertically below the fourth transducer, the second transducer is arranged substantially vertically below the third transducer.

The first means for determining the presence/absence of fluid at the first plane may produce an alarm signal when an absence of fluid is detected.

The second means for determining the presence/absence of fluid at the second plane may produce an alarm signal when a presence of fluid is detected.

The means for determining the alteration of the fluid level may produce an alarm signal when the fluid level is within a predetermined distance of the first plane.

The first means for determining the presence/absence of fluid at the first plane may produce a signal to operate at least one valve to allow or increase the net flow of fluid into the vessel when an absence of fluid is detected.

The second means for determining the presence/absence of fluid at the second plane may produce a signal to operate at least one valve to allow or increase the net flow of fluid out of the vessel when a presence of fluid is detected.

The third means for determining the alteration of the fluid level may produce a signal to operate at least one valve to allow or increase the net flow of fluid into the vessel when the fluid level is within a predetermined distance of the first plane.

The transducer means may transmit and detect ultrasonic waves.

BRIEF DESCRIPTION OF THE DRAWINGS

The present invention will be more fully described by way of example with reference to the accompanying drawings in which:

FIG. 1 is a vertical cross-sectional view of a vessel having a fluid level monitor according to the present invention.

FIG. 2 is a vertical cross-sectional view of a second vessel havivg a fluid level monitor according to the present invention.

FIG. 3 is a vertical cross-sectional view of a third vessel having a fluid level monitor according to the present invention.

DETAILED DESCRIPTION OF THE PREFERRED EMBODIMENTS

Figure 4:
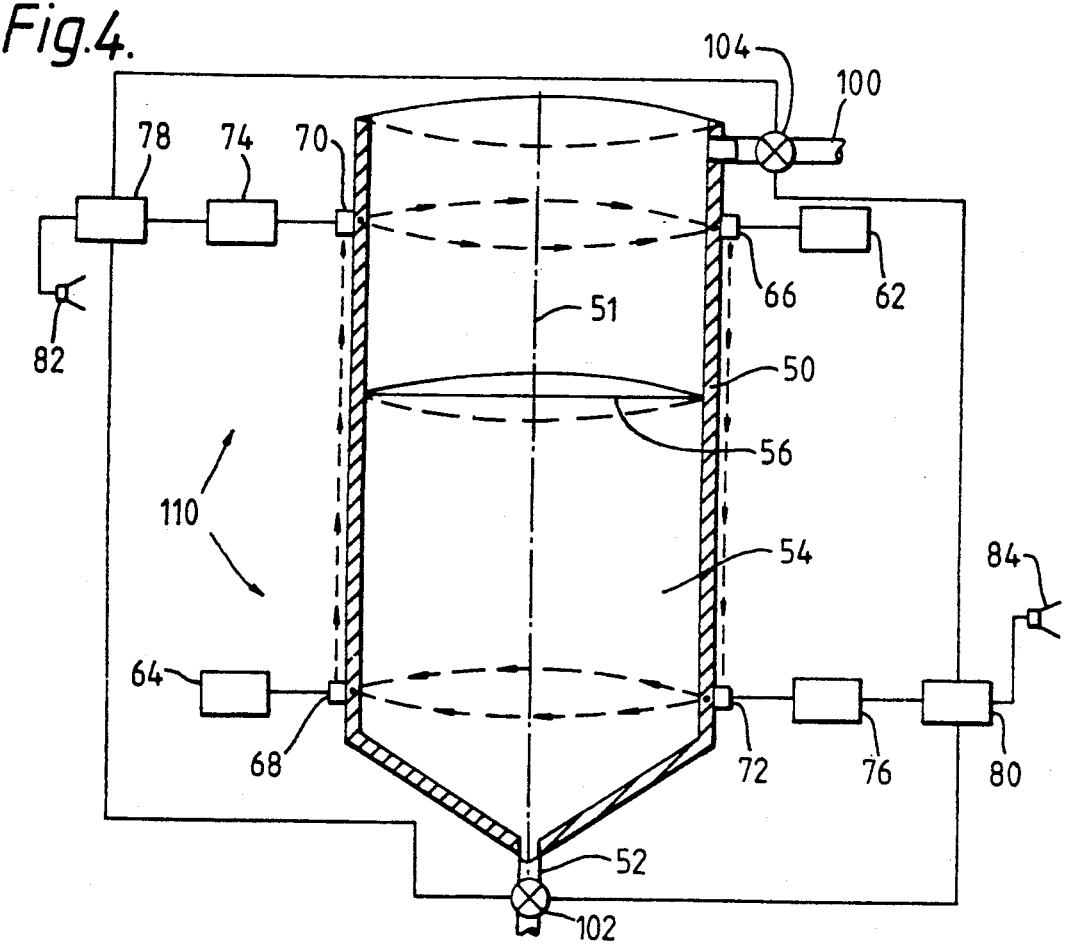
FIG. 4 is an enlarged vertical cross-sectional view of the vessel in FIG. 3 with a further embodiment of a fluid level monitor according to the present invention.

A vessel 10 with a fluid level monitor 20 is shown in FIG. 1. The vessel 10 is a pressure vessel which has an inlet pipe 12 for fluid at a vertically upper position and an outlet pipe 14 for fluid at a vertically lower position. The pressure vessel 10 contains a fluid 16, and the fluid 16 has a fluid level 18. The fluid level monitor 20 comprises an acoustic emission type transducer 22 which is acoustically coupled to the vessel 10 and arranged to lie in a horizontal plane ie a plane perpendicular to the longitudinal direction, vertical axis 11, of the vessel 10. The transducer 22 is a transmitter/receiver transducer and is electrically connected to a pulse generator 24, and is also electrically connected in series to an amplifier 26, a processor 28 and an alarm 30.

In operation the pulse generator 24 sends an electrical pulse or pulses to the transducer 22, which transmits stress waves, elastic waves, ultrasound or acoustic emission into the wall of the vessel 10. The stress waves propagate in the wall of the vessel in a horizontal plane around its periphery and converge at the transducer 22. The stress waves are damped as they propagate around the periphery of the wall, by the wall itself and more significantly by any fluid contacting the wall of the vessel in the horizontal plane containing the transducer.

The stress waves are detected by the transducer 22 and converted into an electrical signal. The electrical signal is amplified by the amplifier 26 and is then analyzed by the processor 28 to determine if fluid is present or absent at the horizontal plane containing the transducer 22. The processor 28 analyses the amplitude of the electrical signal, which corresponds to the amplitude of the stress waves detected by the transducer 22. If the amplitude of the electrical signal is relatively high this corresponds to relatively little damping of the stress waves transmitted into the wall of the vessel, and thus there is no fluid present at the horizontal plane containing the transducer. If the amplitude of the electrical signal is relatively low this corresponds to relatively high damping of the stress waves transmitted into the wall of the vessel, and thus fluid is present at the horizontal plane containing the transducer. The processor 28 may be arranged to send an electrical signal to operate the alarm 30 when either the prescence or the absence of fluid is determined from the amplitude of the electrical signal.

Figure 5:
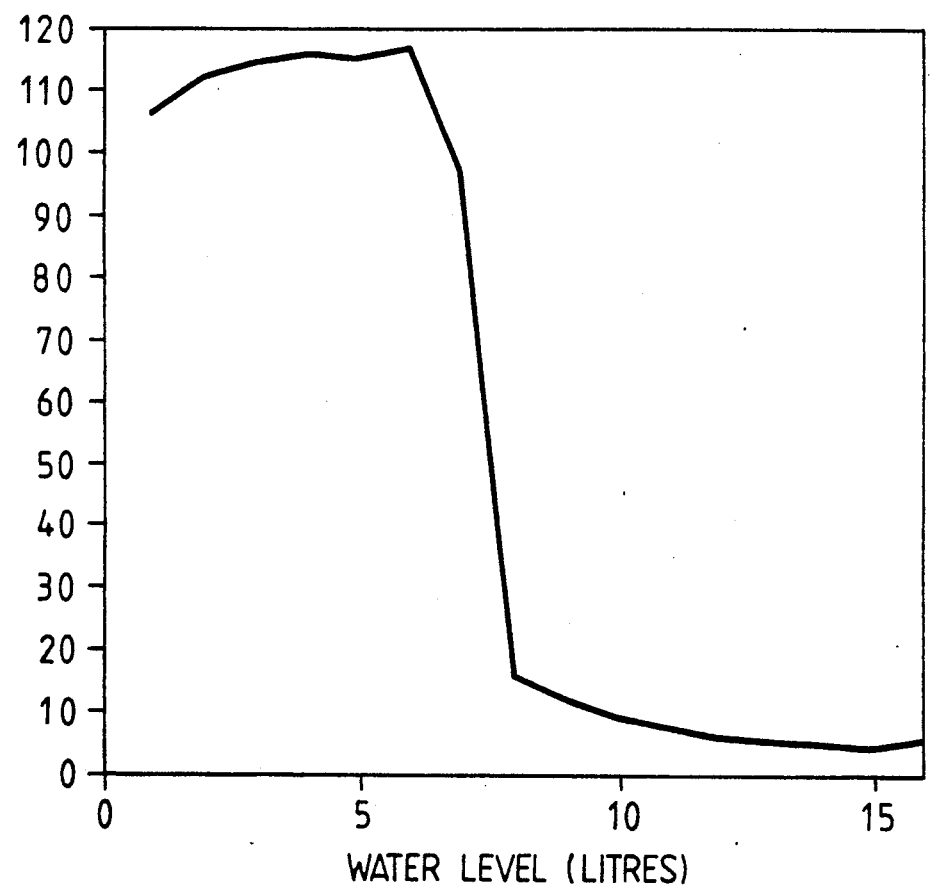
FIG. 5 is a graph of stress wave level against water level for the fluid level monitor in FIG. 1.

In FIG. 5 the stress wave level is plotted against water volume in a vessel, and this shows quite clearly that as the fluid level approaches the horizontal plane containing the transducer or transducers the amplitude of the stress waves falls abruptly.

A vessel 40 with a fluid level monitor 20 is shown in FIG. 2, the vessel 40 is a pipe. The fluid level monitor 20 is substantially the same as the embodiment in FIG. 1.

A vessel 50 with a fluid level monitor 60 is shown in FIG. 3. The vessel 50 is a tank which has an outlet pipe 52 for fluid. The tank contains a fluid 54, and the fluid has a fluid level 56. The fluid level monitor 60 comprises a first pair of transducers 66 and 70 which are acoustically coupled to the tank 50 and arranged to lie substantially in a first vertically upper horizontal plane, which is perpendicular to the longitudinal direction, the vertical axis 51, of the tank 50. A second pair of transducers 68 and 72 are acoustically coupled to the tank 50 and are arranged to lie substantially in a
d vertically lower horizontal plane, which is also perpendicular to the longitudinal direction, the vertical axis 51, of the tank 50.

The transducers 66 and 68 are transmitters and are electrically connected to pulse generators 62 and 64 respectively. The transducers 70 and 72 are receivers and are electrically connected in series to amplifiers 74, 76, processors 78, 80 and alarms 82, 84 respectively.

In operation the pulse generators 62 and 64 send electrical pulses to the transducers 66 and 68 respectively, which transmit stress waves into the wall of the tank 50. The stress waves propagate around the periphery of the wall in the two horizontal planes containing the transducers. The transducers 70 and 72 detect the stress waves and convert them into electrical signals. The electrical signals are amplified by the amplifiers 74 and 76 and are then analyzed by the processors 78 and 80 to determine if fluid is present or absent at the vertically upper horizontal plane containing the transducers 66 and 70, and the vertically lower horizontal plane containing the transducers 68 and 72. The processors analyze the amplitude of the electrical signal, processor 78 is arranged to operate the alarm 82 when the presence of fluid is determined at the vertically upper horizontal plane ie to act as an overfill warning, and processor 80 is arranged to operate the alarm 84 when the abscence of fluid is determined at the vertically lower horizontal plane ie to act as an underfill warning.

The transducers 62 and 70 in the vertically upper horizontal plane, are preferably arranged so that they are equi-spaced on the periphery of the tank or vessel, so that stress waves propagating in opposite peripheral directions converge at the transducer 70 producing relatively higher amplitudes of stress waves. In a similar manner the transducers 64 and 72 in the vertically lower horizontal plane are arranged equi-spaced on the periphery of the tank or vessel.

The vessel 50 with a fluid level monitor 110 is shown in FIG. 4. The tank 50 has an outlet pipe 52 for fluid, and an inlet pipe 100 for fluid. The outlet pipe 52 has a valve 102 to control the flow of fluid from the tank 50, and the inlet pipe 100 has a valve 104 to control the flow of fluid into the tank 50. The tank 50 contains fluid 54, and the fluid has a fluid level 56. The fluid level monitor 110 is similar to the fluid level monitor 60 in FIG. 3, and comprises a first pair of transducers 66 and 70 which are acoustically coupled to the tank 50 and arranged to lie substantially in a first vertically upper horizontal plane, which is perpendicular to the longitudinal direction, vertical axis 51, of the tank 50. A second pair of transducers 68 and 72 are acoustically coupled to the tank 50 and are arranged to lie substantially in a second vertically lower horizontal plane, which is also perpendicular to the longitudinal direction, vertical axis 51, of the tank 50. The transducers 66 and 68 are transmitters and are electrically connected to pulse generators 62 and 64 respectively. The transducers 70 and 72 are receivers and are electrically connected in series to amplifiers 74, 76, processors 78, 80 and alarms 82, 84 respectively.

A main difference between the embodiments in figures 3 and 4 is that the transmitter transducer 68 is arranged substantially in the same vertical plane as, and vertically below, the receiver transducer 70, similarly the receiver transducer 72 is arranged substantially in the same vertical plane as, and vertically below, the transmitter transducer 66.

It is again preferred that the transducers 66 and 70 are equi-spaced on the periphery of the tank 50, and that the transducers 68 and 72 are equi-spaced on the periphery of the tank 50.

In operation the pulse generators 62 and 64 send electrical pulses to the transducers 66 and 68 respectively which transmit stress waves into the wall of the tank 50. These stress waves are detected by the tranducers 70 and 72 and converted into electrical signals which are processed by the processors 78 and 80 to determine if fluid is present or absent at the vertically upper horizontal plane and the vertically lower plane. The processor 78 is arranged to operate the alarm 82, or to operate one or both of the valves 102, 104 to allow a net flow of fluid out of the tank 50 when the presence of fluid is determined. The processor 78 may for example close the valve 104 to prevent further fluid entering the tank 50 while the valve 102 remains open to allow fluid to flow out of the tank 50. The processor 80 is arranged to operate the alarm 84, or to operate one or both of the valves 102, 104 to allow a nett flow of fluid into the tank 50 when the abscence of fluid is determined. The processor 80 may for example close the valve 102 to prevent fluid from leaving the tank 50, while the valve 104 remains open to allow fluid to flow into the tank 50. The processor 80 may open up the valve 104 to allow fluid to enter the tank 50 at a greater flow rate, while the valve 102 remains open to allow fluid to leave the tank 50 at the same flow rate.

By positioning the transmitter transducer 68 vertically below the receiver transducer 70, and the receiver transducer 72 vertically below the transmitter transducer 66 the detection of stress waves propagating substantially axially in the wall of the vessel 50 is possible. The stress waves propagating axially of the vessel are damped to an extent which is dependent upon the axial length of the vessel, between the transducers, which has fluid contacting the wall of the vessel. If the axial spacing between the two horizontal planes containing the two pairs of transducers is relatively small the amplitude of the detected stress waves may be used as a measure of the actual fluid level. If the axial spacing between the two horizontal planes containing the two pairs of transducers is relatively large, the nett damping of the stress waves by the fluid contacting the wall of the tank over a large axial distance, would be so high that the stress waves would not be detected. However, with the fluid contacting the wall of the tank over a small axial distance, in the vicinity of the vertically lower horizontal plane, alteration of the fluid level is detectable by changes in the amplitude of the axially propagating stress waves.

The measurement cycles of the pair of transducers in the vertically upper horizontal plane and the pair of transducers in the vertically lower horizontal plane for detecting the presence or absence of fluid at the two horizontal planes, are phased such that they are conducted alternately. The detection of alteration of the fluid level between the vertically upper plane and the vertically lower plane is carried out simultaneously with the detection of the presence or absence of fluid at both the horizontal planes.

When the transducer 68 transmits stress waves into the wall of the tank 50, the portion of the stress waves propagating axially vertically upwards is detected by the transducer 70. The transducer 70 produces an electrical signal which is amplified and processed by the processor 78. If the electrical signal has a relatively large amplitude there is relatively little damping by fluid contacting the wall of the tank, and if the electrical signal has a relatively small amplitude there is relatively high damping. The processor 78 is arranged to determine when the fluid level is relatively close to the vertically lower horizontal plane and to operate the alarm 82 and/or to operate the valves 102, 104 such that there is a net increase in flow of fluid into the tank 50. Likewise when the transducer 66 transmits stress waves into the wall of the tank 50, the portion of the stress waves propagating vertically downwards is detected by the transducer 72. The transducer 72 produces an electrical signal which is amplified and processed by the processor 80. The processor 80 is arranged to determine when the fluid level is relatively close to the vertically lower horizontal plane and to operate the alarm 84 and/or to operate the valves 102, 104 such that there is a nett increase in flow of fluid into the tank 50. The fluid level monitor may be used to control the fluid level in the tank.

Figure 6:
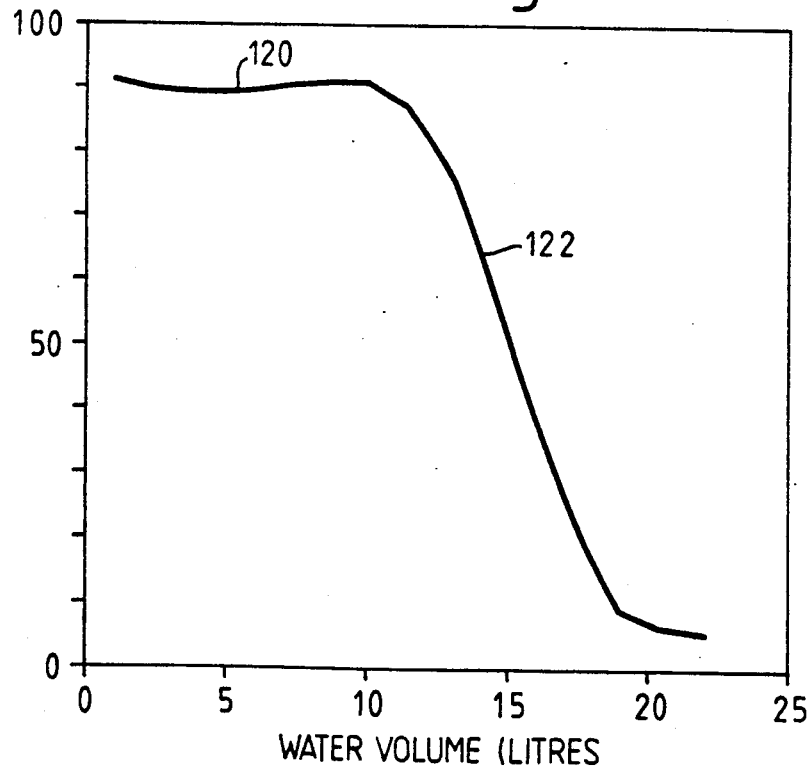
FIG. 6 is a graph of stress wave level against water volume the fluid level monitor in FIG. 4 in one mode of operation.

A graph of stress wave level against water volume is shown in FIG. 6, for axially spaced transmitter and receiver transducers, illustrating that as the fluid level increases the amplitude of the stress waves falls slowly initially over region 120 and then much more quickly over region 122. In this example the transducers were spaced apart vertically by 24.5 cm, and were operating at a frequency of 450 KHz.

The transducers must be positioned on the vessel such that the stress waves propagate in the shortest peripheral direction around the walls of the vessel. For circular cross-section tanks the transducers are arranged in a plane substantially perpendicular to the longitudinal direction or axis of the tank, for rectangular cross-section tanks the transducers are, arranged in a plane substantially perpendicular to the longitudinal direction of the tank. Irregular cross-section tanks would have the transducers arranged in a plane substantially perpendicular to the longitudinal direction of the tank.

The movement of the transducers away from a plane perpendicular to the longitudinal direction of the vessel increases the distance of propagation of the stress waves between the transducers, and decreases the amplitude of the detected stress waves.

It is believed that the invention will work with tanks having smooth cornered rectangular or other cross-sectional shapes.

The invention is applicable not only to vessels with their axes arranged vertically, but also to vessels with their axes arranged in other directions.

If the longitudinal direction of the vessel is angled with respect to the vertical direction, the invention is still applicable for detecting the fluid level even though the transducers are not in a horizontal plane. The fluid level will be horizontal, as the fluid level rises the fluid will initially contact the tank in the plane containing the transducers at one point, and this will provide little damping to the stress waves, but the damping will gradually increase as the fluid level rises until the fluid contacts the tank over the whole of the plane containing the transducers.

The invention is applicable for the monitoring of fluid levels in all types of vessels as well as tanks and pipes.

The invention is applicable for use with all fluids, or substances which have fluid like properties ie liquids, and particulate or powdered substances.

The invention is also suitable for the monitoring of gas or air locks or bubbles in pipes.

The fluid level monitor according to the invention is non-intrusive, because the transducers may be acoustically coupled to the exterior surface of the vessel, it is easy to install, replace or clean and may be used with aggressive, corrosive, hazardous or sterile fluids. The fluid level monitor is non-hazardous as it uses low power energy.

The transducers may be ultrasonic transducers and by suitable choice of the ultrasonic frequency and means of generation, the stress waves may be arranged to be a plate wave or Lamb wave. It is well known that plate waves are not supported by a fluid-solid surface.

I claim:

1. A fluid level monitor for monitoring the level of fluid in a vessel comprising first acoustic emission transducer means acoustically coupled to the wall of the vessel substantially in a first plane perpendicular to the longitudinal direction of the vessel, second acoustic emission transducer means acoustically coupled to the wall of the vessel substantially in a second plane perpendicular to the longitudinal direction of the vessel, the first and second planes being longitudinally spaced, the first transducer means being arranged to transmit stress waves into the wall of the vessel, the stress waves propagate around the perphery of the wall and are damped by any fluid contacting the wall in the first plane, the first transducer means being arranged to detect stress waves propagating in the wall and to convert them into a first electrical signal, the first electrical signal corresponds to the stress wave activity detected by the first transducer means, first means for determining the presence/absence of fluid at at least a portion of the first plane from the amplitude of the first electrical signal corresponding to the stress wave activity detected, the second transducer means being arranged to transmit stress waves into the wall of the vessel which propagate around the periphery of the wall and are damped by any fluid contacting the wall in the second plane, the second transducer means being arranged to detect stress waves propagating in the wall and to convert them into a second electrical signal, the second electrical signal corresponds to the stress wave activity detected by the second transducer means, second means for determining the presence/absence of fluid at at least a portion of the second plane from the amplitude of the second electrical signal corresponding to the stress wave activity detected, the first transducer means and second transducer means being positioned substantially in at least one plane parallel to the longitudinal direction of the vessel such that stress waves transmitted into the wall of the vessel by at least one of the first transducer means or second transducer means and propagating generally longitudinally along the vessel are detected by the second transducer means or first transducer means to produce a third electrical signal, means for determining the alteration of the fluid level between the first plane and the second plane from the amplitude of the third electrical signal.

2. A fluid level monitor as claimed in claim 1 in which the first and second transducer means are arranged to transmit stress waves into the wall of the vessel alternately.

3. A fluid level monitor as claimed in claim 1 in which the vessel is a pipe.

4. A fluid level monitor as claimed in claim 1 in which the fluid is a liquid, a particulate substance or a powder substance.

5. A fluid level monitor as claimed in claim 1 in which the first transducer means comprises a first transducer which transmits stress waves into the wall of the vessel and a second transducer which detects stress waves propagating in the wall of the vessel.

6. A fluid level monitor as claimed in claim 5 in which the first and second transducers are equi-spaced such that stress waves propagating in opposite directions in the wall of the vessel converge at the second transducer to produce relatively higher detected stress wave activity.

7. A fluid level monitor as claimed in claim 5 in which the second transducer means comprises a third transducer which transmits stress waves into the wall of the vessel and a fourth transducer which detects stress waves propagating in the wall of the vessel.

8. A fluid level monitor as claimed in claim 7 in which the third and fourth transducers are equi-spaced such that stress waves propagating in opposite directions in the wall of the vessel converge at the fourth transducer to produce relatively higher detected stress wave activity.

9. A fluid level monitor as claimed in claim 7 in which the first transducer and the fourth transducer are arranged substantially in a third plane parallel to the longitudinal direction of the vessel, the second transducer and the third transducer are arranged substantially in a fourth plane parallel to the longitudinal direction of the vessel.

10. A fluid level monitor as claimed in claim 9 in which the third and fourth planes are parallel to each other.

11. A fluid level monitor as claimed in claim 10 in which the first transducer is arranged substantially vertically below the fourth transducer, the second transducer is arranged substantially vertically below the third transducer.

12. A fluid level monitor as claimed in claim 1 in which the first means for determining the presence/absence of fluid at the first plane produces an alarm signal uhel an absence of fluid is detected.

13. A fluid level monitor as claimed in claim 1 in which the second means for determining the presence/absence of fluid at the second plane produces an alarm signal when a presence of fluid is detected.

14. A fluid level monitor as claimed in claim 11 in which the means for determining the alteration of the fluid level produces an alarm signal when the fluid level is within a predetermined distance of the first plane.

15. A fluid level monitor as claimed in claim 1 in which the first means for determining the presence/absence of fluid at the first plane produces a signal to operate at least one valve to allow or increase the net flow of fluid into the vessel when an absence of fluid is detected.

16. A fluid level monitor as claimed in claim 1 in which the second means for determining the presence/absence of fluid at the second plane produces a signal to operate at least one valve to allow or increase the net flow of fluid out of the vessel when a presence of fluid is detected.

17. A fluid level monitor as claimed in claim 1, in which the third means for determining the alteration of the fluid level produces a signal to operate at least one valve to allow or increase the net flow of fluid into the vessel when the fluid level is within a predetermined distance of the first plane.

18. A fluid level monitor as claimed in claim 1 in which the transducer means transmit and detect ultrasonic waves.

* * * * *